Feb. 18, 1964  A. J. WISNIEWSKI  3,121,445
FLOW CONTROL DEVICE
Filed June 12, 1961
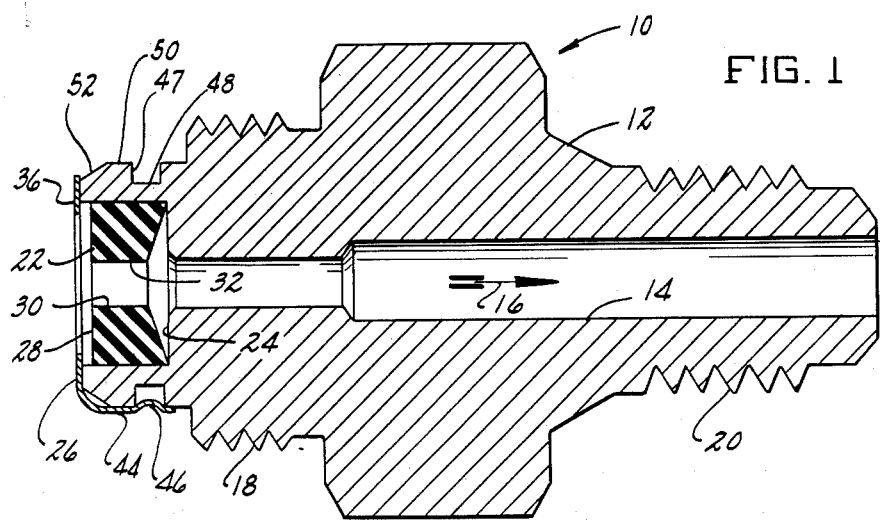
FIG. 1
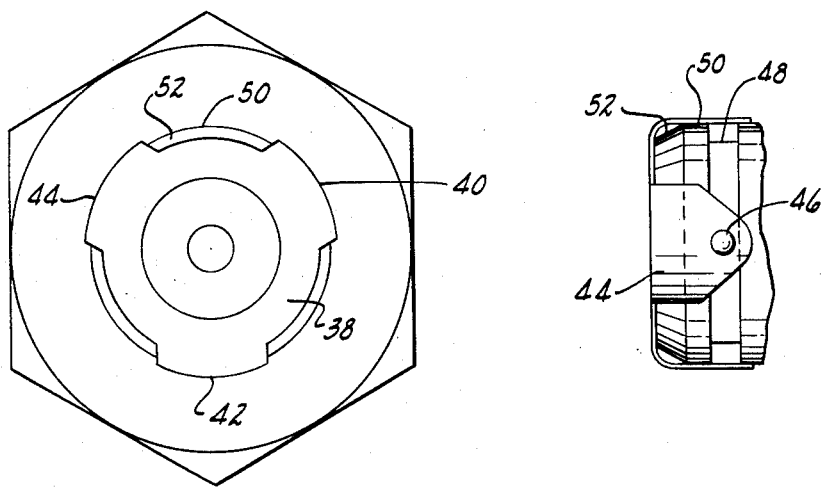
FIG. 2
FIG. 3
INVENTOR.
ARTHUR J. WISNIEWSKI
BY
Andrew K. Doulds
his ATTORNEY

United States Patent Office 3,121,445
Patented Feb. 18, 1964

3,121,445
FLOW CONTROL DEVICE
Arthur J. Wisniewski, Hamtramck, Mich., assignor to American Radiator & Standard Sanitary Corporation, New York, N.Y., a corporation of Delaware
Filed June 12, 1961, Ser. No. 116,506
5 Claims. (Cl. 138—45)

This invention relates to fluid flow control structures, and particularly to an improved mechanism for providing a constant flow of fluid in the presence of fluctuating fluid pressures.

In certain fluid flow installations it is the usual practice to control or regulate the volumetric delivery through a fluid passage by disposing a resilient, deformable flow control element in the passage. The flow control element is generally of annular construction and is formed with a flow opening therethrough so that fluid pressure acts on the upstream face of the element to deflect the inner peripheral areas thereof into a smaller opening to thus throttle the flow as the inlet pressure increases.

In order to mount and retain these flow control elements in place it has been the practice to provide an internal groove in the passage-forming wall structure and to dispose a C-ring or the like in the groove. Such C-rings can only be removed with special tools and only after considerable effort on the part of the serviceman.

One object of the present invention is to provide a flow control device wherein the flow control member is removably locked within the fluid passage by means of a novel easily installed and removed retainer structure.

A further object of the invention is to provide a flow control device wherein the retainer for the flow control element may be removed quickly without special tools.

A further object of the invention is to provide a flow control device wherein the retainer for the flow control element can be removed without any damage to itself, thereby enabling the same retainer to be used again after replacement of the flow control element, and obviating the need for the serviceman to carry a supply of such retainer elements.

A still further object of the invention is to provide a flow control device having a retainer structure which is resistant to destruction in service, and which does not interfere with proper operation of the flow control device.

Other objects of this invention will appear from the following description and appended claims, reference being had to the accompanying drawings forming a part of this specification wherein like reference characters designate corresponding parts in the several views.

In the drawings:

FIGURE 1 is a longitudinal sectional view taken through one embodiment of the invention;

FIG. 2 is a left end elevational view of the FIG. 1 embodiment; and

FIG. 3 is a bottom plan view of a portion of the FIG. 1 structure.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring in greater detail to the drawings, there is shown a flow control device 10 including a passage-forming housing structure 12 having a flow passage therethrough indicated generally by numeral 14, the direction of fluid flow being denoted by arrow 16. One environment of the invention is in coin-operated dispensers for soft drinks, coffee and other liquids, which it is desired to dispense on a time flow basis. In such an environment the total volume delivered per cycle should be the same irrespective of pressure variations in the fluid supply; hence the necessity for a device such as flow control device 10. In the described environment each fluid line is equipped with one flow control device, as by installing the device directly in the line, using threaded areas 18 and 20 for this purpose.

Flow regulation may be obtained by a conventional resilient-deformable flow control annulus 22, which is disposed within a pocket 24 formed in the upstream end surface 26 of housing 12, the arrangement being such that the inlet fluid pressure acts against the upstream face 28 of the flow annulus to deform its unsupported inner portions and thereby force the upstream internal peripheral edge 30 to move with a radially inward component of motion such as to restrict the size of flow opening 32. In this manner, as the upstream pressure increases the size of the flow opening 32 decreases, and as the upstream pressure decreases the size of the flow opening increases, thus maintaining a substantially constant volumetric discharge through passage 14 irrespective of supply pressure variations.

In order to operatively retain flow element 22 within pocket 24 there is provided a retainer 36, preferably formed from a single sheet of material which may for example be metal or plastic. The illustrated retainer includes an annular face portion 38 and three identical spring arms 40, 42 and 44. Each spring arm is provided with a detent-forming dimple or depression 46 which, as shown in FIG. 1, is adapted to engage behind a shoulder 47 formed by endless circumferential groove or recess 48. Peripheral cylindrical surface 50 of the housing structure connects with end surface 26 via a frusto-conical cam surface 52 which serves to aid in installing the retainer 36 onto the housing structure. Thus, after flow element 22 has been placed in pocket 24 the retainer 36 may be advanced axially toward end face 26, whereupon the terminal ends of spring arms 40, 42 and 44 strike cam surface 52 to thus cause the spring arms to spread apart and permit the dimples 46 to ride on peripheral surface 50 until they snap into peripheral groove 48.

In its installed position retainer 36 effectively prevents dislodgement of flow control element 22, which might otherwise be caused, for example, by fluid back pressures or inverted positioning of the housing structure. In this connection it will be noted that any tendency of element 22 to be dislodged from pocket 24 causes a leftward pressure to be exerted on the annular portion 38 of the retainer element. This leftward pressure has a tendency to balloon the annular portion 38 but this ballooning tendency does not tend to dislodge the locking dimples 46 from groove 48; rather it actually tends to increase the locking action since the ballooning promotes an inward fulcrumming of the arms 40, 42 and 44 around their areas of connection with face portion 38. In most cases there would be no substantial ballooning force on the retainer, and the retainer could be made of very thin stock at very low expense.

In removing retainer 36 from housing 12 the serviceman has only to insert his fingernail underneath one of the edge areas of any of spring arms 40, 42 or 44. The groove 48 provides an undercut or void space which facilitates this fingernail insertion step. As the fingernail is inserted beneath one of the spring arms, it shifts the dimple 46 out of the groove 48, which frees one spring arm from the housing surface. The other two spring arms' locking engagement with the housing structure is destroyed since these spring arms are spaced less than one hundred eighty degrees from each other; therefore the retainer automatically slips off the end of the housing structure. The entire retainer-removal operation is effected practically instantaneously with a single finger motion and without need of tools or instruments. Since the retainer-removal operation does not permanently deform the retainer it is possible to use the same retainer after replacement of the flow control annulus.

The illustrative drawings show groove 48 as an endless peripheral groove. Such an endless groove is advantageous in that it permits the retainer to be installed on the housing structure in any position of radial adjustment without requiring the serviceman to precisely line up the dimples 46 with housing structure recesses. However, groove 48 might be replaced with a series of non-continuous grooves without departing from the broader aspects of the invention.

The drawings show a unitary one-purpose device adapted for installation between two fluid conduit sections (not shown). It is contemplated, however, that the teachings of this invention could be utilized in valves, valve bodies and other major fluid controlling systems, i.e., it is not necessary that the flow control device be formed as a separate one-purpose unit apart from other valve structures.

Various other modifications may of course be resorted to (as for example in respect to the type of flow control element 22) without departing from the spirit of the invention as set forth in the accompanying claims.

I claim:

1. In combination, fluid passage means, including an annular wall structure having an end surface and a peripheral side surface; said end surface having a pocket formed therein, and said side surface having shoulder means thereon, the juncture between said side surface and said end surface constituting a cam surface; a resilient flow control element disposed within the pocket for regulating the volume of fluid passing therethrough; and means for retaining the flow control element in its operative position, including an annular wall portion overlying the end surface, a series of spring arms extending therefrom along the peripheral side surface, and detents carried by the spring arms to engage the shoulder means for releasably locking the retaining means on the annular wall structure, said annular wall structure having external threads formed on its peripheral side surface at points adjacent the shoulder means; said threads being of greater diameter than the profile diameter defined by the spring arms so that the annular wall structure may be installed in a fluid system by inserting its threaded portion into an internally threaded system member.

2. In combination, fluid passage means, including an annular housing structure having an end surface and a peripheral side surface; said end surface defining a pocket, and said side surface defining an external recess, the juncture between said side surface and end surface constituting a cam face; means including a resilient flow control member seated in said pocket and responsive to fluid pressure variations thereon to maintain a substantially constant flow through the fluid passage; and means for retaining the resilient member in the pocket, including a wall structure located adjacent the end surface, and a series of circumferentially spaced spring arms extending therefrom along portions of the peripheral side surface of the housing structure; said spring arms having integrally formed detents engaged in the recess for removably locking the retainer on the annular housing structure.

3. In a fluid system: a tubular one piece fluid flow coupling element having a pocket in its upstream end surface and a fluid passage leading downstream from said pocket; a deformable flow control member removably disposed in said pocket for regulating the volume of fluid discharged into the passage; an external groove formed in the outer side surface of the coupling element in general radial alignment with the pocket; external threads formed in the outer side surface of the coupling element at points immediately adjacent the groove for mounting the coupling element in the fluid system; and a retainer, including an annular wall section closely overlying the flow control member, a series of circumferentially spaced spring arms extending from the wall section along the outer side surface of the coupling element, and detents carried by the spring arms within the groove for releasably locking the retainer on the coupling element; said threads being of greater diameter than the profile diameter defined by the spring arms so that the coupling can be installed in the system by inserting its threaded portion into an internally threaded system member.

4. In a fluid system: fluid passage means including an annular wall structure having a portion thereof designed to fit into an opening in a companion system member; said wall structure having an end surface and a peripheral side surface, the portion of said side surface immediately adjacent the end surface having a lesser profile diameter than that of the companion system member opening to pass freely therethrough; a pocket formed in the end surface; resilient flow control means removably disposed within the pocket for regulating the volume of fluid passing therethrough; and means for retaining the resilient flow control means in its operative position, including first wall portions overlying the end surface, and second wall portions releasably lockably engaging the peripheral side surface in snap-on relationship.

5. In a fluid passage system: fluid passage means including an annular passage structure having an end surface and a peripheral side surface; said end surface having a pocket formed therein; resilient flow control means disposed within the pocket for regulating the volume of fluid passing therethrough; and means for retaining the flow control means in its operative position, including a first wall portion overlying the end surface and a second wall portion disposed in snap-on engagement over the portion of peripheral side surface adjacent the end surface; said annular passage structure having a portion of its peripheral side surface remote from the end surface adapted to tightly fit within an internal surface on a mating system member whereby to connect the annular passage structure into the passage system; said remote portion of the peripheral side surface having a greater diameter than the profile diameter defined by the second wall portion of the retaining means to permit removal of the annular passage structure from the mating system member without dislocation of the retaining means from the passage structure.

References Cited in the file of this patent

UNITED STATES PATENTS

| | | |
|---|---|---|
| 2,109,805 | Stewart | Mar. 1, 1938 |
| 2,454,929 | Kempton | Nov. 30, 1948 |
| 2,565,571 | Naumann | Aug. 28, 1951 |
| 2,636,640 | Bedford | Apr. 28, 1953 |
| 2,790,463 | Delano et al. | Apr. 30, 1957 |
| 2,891,578 | Dahl et al. | June 23, 1959 |
| 2,936,788 | Dahl et al. | May 17, 1960 |